April 25, 1961 G. A. NEYHOUSE ET AL 2,981,089
POWER DRIVE APPARATUS

Filed April 6, 1959 3 Sheets-Sheet 1

INVENTORS.
Jack W. Savage
Ralph K. Shewmon
BY George A. Neyhouse

C. R. Meland

Their Attorney

INVENTORS.
Jack W. Savage
Ralph K. Shewmon
George A. Neyhouse
BY C. R. Meland
Their Attorney April 25, 1961 G. A. NEYHOUSE ET AL 2,981,089
POWER DRIVE APPARATUS
Filed April 6, 1959 3 Sheets-Sheet 3

INVENTORS.
Jack W. Savage
Ralph K. Shewmon
George A. Neyhouse
BY
C. R. Meland
Their Attorney United States Patent Office 2,981,089
Patented Apr. 25, 1961

2,981,089

POWER DRIVE APPARATUS

George A. Neyhouse and Jack W. Savage, Dayton, and Ralph K. Shewmon, Centerville, Ohio, assignors to General Motors Corporation, Detroit, Mich., a corporation of Delaware Filed Apr. 6, 1959, Ser. No. 804,371

10 Claims. (Cl. 68—24)

This invention relates to power drive apparatus that includes an electric motor and more particularly to power drive apparatus for washing machines and the like.

In present day washing machines and in other electric motor driven apparatus, it has become desirable to provide a plurality of speeds for a driven load. This requirement, for example, of a plurality of tub speeds for a washing machine has severely taxed the drive system for the tub due to the constantly changing torque requirements and it has often required the use of an excessively large motor in order to meet peak torque requirements and the use of excessively large components for the drive system.

It is, accordingly, an object of this invention to provide a power drive apparatus for the tub of a washing machine or the like wherein the torque output of the motor is patterned to the torque requirement of the machine, thus greatly reducing hammering and over-stressing of the drive mechanism.

Another object of this invention is to provide a power drive apparatus that is capable of providing three tub speeds with the use of a single speed motor and a two speed transmission. This object is accomplished by operating the motor at its running speed in both the high and low settings of the transmission and by de-energizing the motor with the transmission shifted to its high speed setting to provide a third tub speed.

Still another object of this invention is to provide a power drive apparatus for the tub of a washing machine that includes an electric motor and a two speed transmission and wherein means are provided for preventing shifting of the transmission to its high speed position when the motor is at rest. This means that the motor will never have to start the machine when the transmission is in its high speed shifted position even when the timer is set for high speed operation.

Further objects and advantages of the present invention will be apparent from the following description, reference being had to the accompanying drawings wherein preferred embodiments of the present invention are clearly shown.

Figure 1:
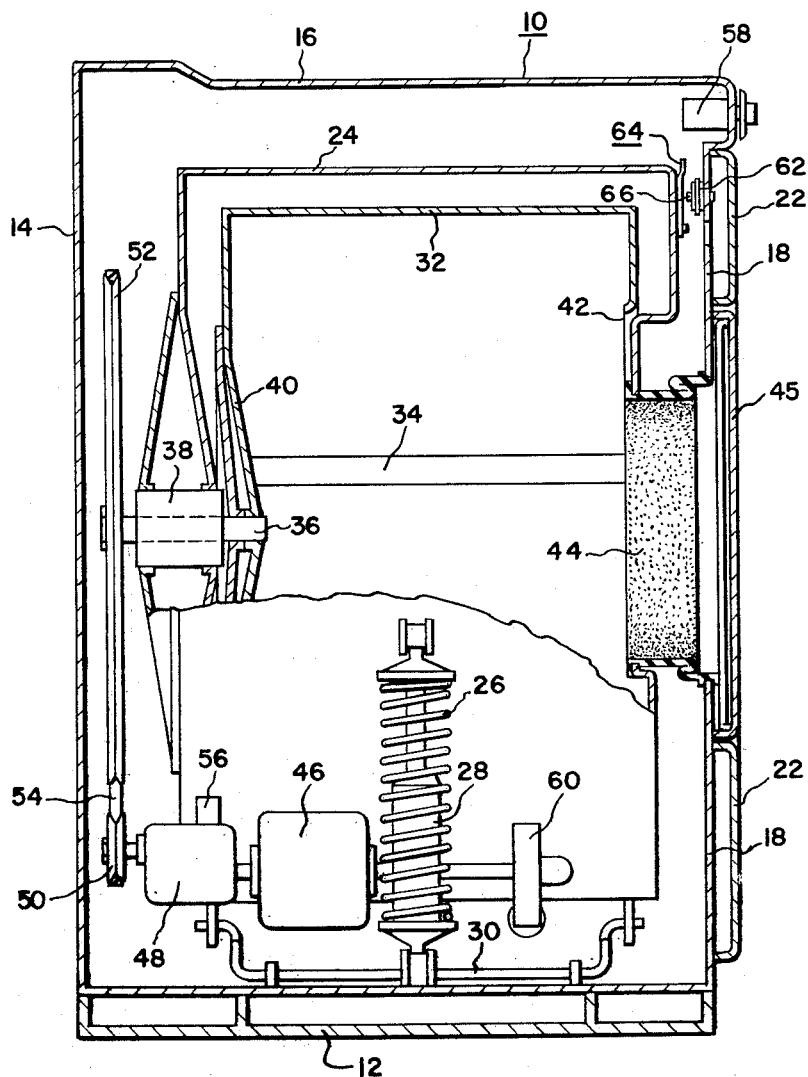
Figure 1 is a side view with parts broken away of a washing machine that is adapted to be driven by the power drive apparatus of this invention.

Referring now to the drawings and more particularly to Figure 1, a washing machine of the type that is adapted to be driven by the control circuit apparatus of this invention is illustrated. The washing machine as shown in Figure 1 is generally designated by reference numeral 10. The machine has a main base 12 and a cabinet comprised of a rear wall 14, a top wall 16 and a front wall 18. The washing machine has a decorative panel designated by reference numeral 22. An imperforate tub designated by reference numeral 24 is positioned within the cabinet and is supported therein by springs 26 and fluid pressure shock absorbers 28. The spring and shock absorbers are pivoted to the main frame 12 and to the tub 24 and two springs and two shock absorbers are employed, only one of which is illustrated in Figure 1. The tub is prevented from substantial front to back movement by a torsion bar designated by reference numeral 30 which is pivoted in suitable bearings in main frame 12 and is pivoted to the tub 24. A tumbling drum or rotatable tub 32 is disposed within the outer tub 24 and its outer circumference is perforated in accordance with well-known washing machine practice. The tumbling drum has one or more tumbling vanes 34 extending lengthwise of the tub or drum 32. The tumbling drum is fixed to a shaft designated by reference numeral 36 which is journalled in a bearing designated by reference numeral 38 and supported by the tub 24. The rear wall of the tumbling drum 40 is inclined inwardly as is clearly apparent from the drawings. The cabinet of the washing machine is provided with a door 45 that is suitably pivoted thereto and the cabinet and tub 24 are interconnected by a flexible member designated by reference numeral 44. The flexible member 44 may be formed of rubber and the like and forms a tight seal with the door 45 when the door is in a closed position. It will be apparent that the flexible member 44 prevents washing liquid from being expelled outwardly of the tub 24 when the door 45 is closed.

The drive mechanism for rotatably driving the tumbling drum or tub 32 comprises an electric motor designated by reference numeral 46. The electric motor is mechanically coupled with any conventional two speed transmission means so that the tub 32 may be driven at two different speeds with a single speed of rotation of the motor. In the embodiment shown in Figure 1, the electric motor 46 is coupled with the two speed transmission designated by reference numeral 48. The transmission includes a solenoid coil designated by reference numeral 56 which is adapted to shift the transmission from its low speed position to its high speed position when it is energized. The output shaft of two speed transmission 48 is connected with a pulley 50 and this pulley drives a pulley 52 through a V-belt 54. The pulley 52 is connected with shaft 36 and, thus, will rotatably drive the tumbling drum or tub 32. The electric motor 46 may also be mechanically coupled to a pump designated by reference numeral 60 which is adapted to exhaust water from the tub 24.

The drive mechanism from the motor 46 to the tub 32 preferably has such a speed ratio that the tub 32 is driven one revolution for every forty revolutions of the electric motor 46 when the transmission 48 is in its low speed setting. The transmission 48 is always in its low speed setting when the solenoid 56 is de-energized. When the solenoid 56 is energized, the transmission is shifted so that tub 32 is driven one revolution for every four revolutions of electric motor 47.

The washing machine is preferably provided with a suitable timer designated by reference numeral 58 which controls the cycle of operation of the machine. This timer includes the usual electric motor which drives a plurality of timer cams that operate to control the opening and closing of a plurality of timer switches. These switches are schematically shown in Figures 2 through 5 of the drawings and their function with respect to the remainder of the electrical circuit is described in connection with these figures.

The tub 24 has a switch actuator 64 which is adapted to contact a switch button 66 of electric switch 62. The electric switch 62 is mounted to the front portion 18 of the cabinet and thus is fixed with respect to movement of the tub 24. When the tub 24 moves excessively in a front to back movement, the switch button 66 is contacted to open the switch 62. The switch actuator 64 which is fixed to the tub 24 may also include other cam faces such that rotation of the tub in a side to side movement will cause the switch button 66 to be moved to open the switch 62. This switch may be termed an unbalance or bump switch as it opens upon a predetermined unbalanced movement of the tub 24. The switch is illustrated schematically in several of the schematic electrical diagrams illustrated in Figures 2 through 5. Its operation in conjunction with the electrical circuit is more fully described hereinafter.

Figure 2:
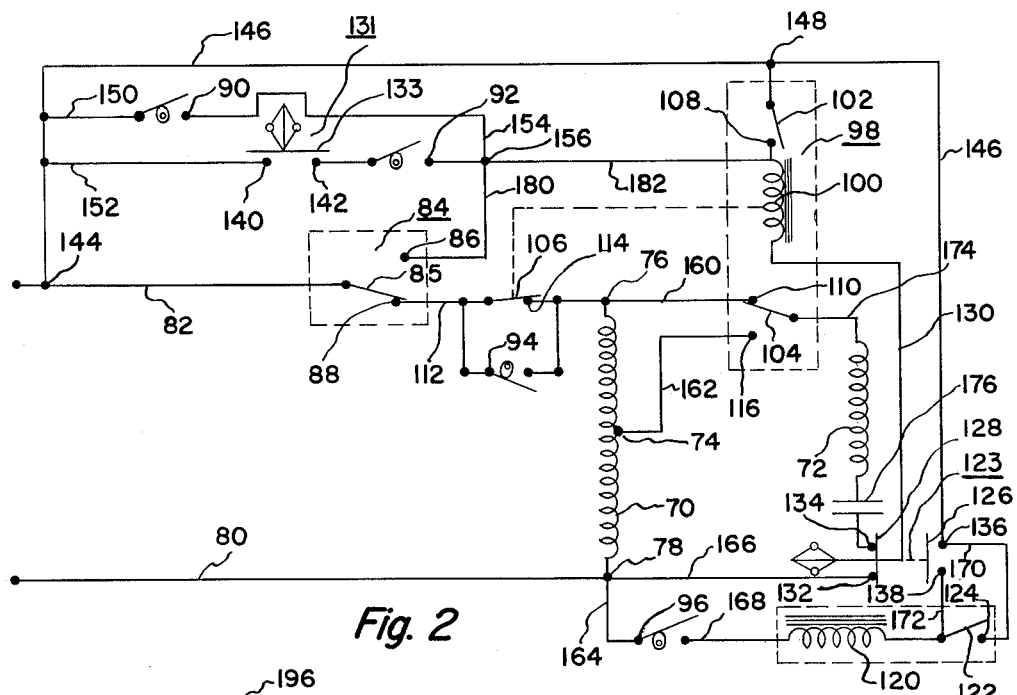
Figure 2 is a schematic illustration of a control circuit for the electric motor and two speed transmission that drives the tub of the machine illustrated in Figure 1.

Referring now more particularly to Figure 2, a circuit diagram is shown for controlling the operation of the electric motor 46 and the two speed transmission 48. In Figure 2, the electric motor 46 has a four-pole main winding generally designated by reference numeral 70 and has a four-pole start or phase winding designated by reference numeral 72. The main winding 70 is center tapped as at 74 and is connected with junctions 76 and 78. The junction 78 is connected with a lead wire 80 which forms one of the power input terminals for the electric motor. The other power input terminal is designated by reference numeral 82 and these two lines are adapted to be connected with a suitable source of A.C. voltage.

In the circuit of Figure 2, the unbalance switch is generally designated by reference numeral 84. It will be apparent that this unbalance switch corresponds to the switch designated by reference numeral 62 in Figure 1. The unbalance switch 84 has a movable contactor designated by reference numeral 85 which may contact either contact 86 or contact 88. The movable contactor 85 normally engages contact 88 when there is no unbalanced condition of the tub 24. When the tub 24 moves under an unbalanced condition, it operates to shift the movable contactor 85 temporarily into engagement with fixed contact 86. This only occurs when the tub 24 is moved excessively under an unbalanced load.

In the circuit of Figure 2, the timer operated switches that control operation of the electric motor and two speed transmission are designated by reference numerals 90, 92, 94 and 96. It will be understood that these timer operated switches 90, 92, 94 and 96 close and open in a predetermined sequence to be more fully described hereinafter.

A relay generally designated by reference numeral 98 is provided having an actuating coil 100. This relay controls the movement of contactors 102, 104 and 106. When relay coil 100 is de-energized, the movable contactor 102 is out of engagement with contact 108 and the contactor 104 remains in engagement with contact 110. With relay coil 100 de-energized, the contactor 106 completes a circuit between lead wire 112 and fixed contact 114. When relay coil 100 is energized, the contactor 102 is moved into engagement with contact 108 and the contactor 104 is shifted into engagement with contact 116. In a like manner, when the relay coil 100 is energized, the contactor 106 is shifted out of engagement with contact 114 to open its circuit between lead wire 112 and junction 76.

In the circuit of Figure 2, the solenoid 56 of the circuit of Figure 1, which is the solenoid for shifting the transmission from its low speed setting to its high speed setting, is designated by reference numeral 120. The solenoid coil 120 is arranged to shift the transmission to its high speed setting when energized and is adapted to cause a movable contactor 122 to engage a fixed contact 124 when the coil is energized. The energization of coil 120 will thus shift the transmission to a high speed setting and will also form a holding circuit for the coil 120 through the contactor 122.

In the circuit of Figure 2, a pair of centrifugal switches are disclosed which are both driven at motor speed in a conventional fashion. The first of these centrifugal switches is generally designated by reference numeral 123 and includes a pair of contactors 126 and 128. The contactor 128 is connected with a lead wire 130 whereas the contactor 126 is insulated both from the contactor 128 and lead wire 130. The contactor 128 normally connects fixed contacts 132 and 134 when the motor is at rest. When the motor attains a speed of approximately 1500 r.p.m., the contactor 128 shifts out of engagement with contacts 132 and 134 and causes contactor 126 to engage contacts 136 and 138. The operation of the centrifugal switch is such that the contactor 128 will re-engage fixed contacts 132 and 134 at some lower speed, for example, 1200 r.p.m. It will be appreciated that the running speed of the motor, being a four-pole induction motor, may be approximately 1725 r.p.m. The second centrifugal switch is generally designated by reference numeral 131 and comprises a movable contactor 133 which, at times, engages fixed contacts 140 and 142. The centrifugal switch 131 is driven at motor speed and is designed to close fixed contacts 140 and 142 whenever the motor has a speed of 750 r.p.m. or higher and remains open below this speed. This corresponds to a tub speed of approximately 188 r.p.m. when the transmission is shifted to its high speed setting.

The line 82, which forms one power input terminal for the circuit illustrated in Figure 2, is connected with a junction 144 which is, in turn, connected with lead wire 146. It is seen that lead wire 146 forms a common connection for junctions 148 and 136 and is connected with leads 150 and 152. A lead wire 154 is connected between the timer operated switch 90 and the junction 156. The junction 156 is connected to one side of relay coil 100 and is also connected with fixed contact 86 of the unbalance switch 84.

The junction 76 is connected with one side of relay operated switch 106 and with fixed contact 110 by means of a lead 160. The fixed contact 116 is connected with the tap point 74 of the main motor winding by a lead 162. The junction 78 is connected to one side of timer operated switch 96 by a lead wire 164 and is connected with centrifugal switch contact 132 by a lead wire 166. One side of timer operated switch 96 is connected with the transmission shifting coil 120 via a lead 168. The fixed contacts 136 and 124 are connected by a lead wire 170. A lead wire 172 connects the centrifugal switch contact 138 and a common junction for solenoid shifter coil 120 and the movable contactor 122.

The phase or start winding 72 is connected with movable contactor 104 via a lead 174 and the opposite of the phase winding is connected with centrifugal switch contact 134 through a capacitor 176.

When it is desired to effect a low speed tumbling operation of the tumbling drum 32 with the circuit of Figure 2, the timer operated switches are actuated so that switches 90 and 94 are closed while switches 92 and 96 are held open. When switch 90 is closed, a circuit is made for relay coil 100 which causes the contactor 104 to shift into engagement with fixed contact 116. The motor will now be started from rest with less than its full torque output since the phase or start winding 72 will be energized from the tap point 74 of main winding 70. This will reduce the voltage applied to phase or start circuit 72 as compared with normal line voltage as a function of the amount of voltage tapped off the main winding 70. The motor will thus accelerate with its medium value of accelerating torque and, at approximately 1500 r.p.m., the phase or start winding 72 will be disconnected from the circuit due to the movement of centrifugal switch contactor 128 out of engagement with contacts 132 and 134. The tumbling drum will now be driven at approximately 43 r.p.m. with the motor operating at approximately 1725 r.p.m. due to the forty to one speed ratio that is achieved by not energizing the spin shift coil 120. This low speed tumble operation is ordinarily used for a washing operation of the clothes or a rinsing operation.

In many washing machines, it is desirable to have an intermediate or low speed spin cycle wherein the tub 32 is accelerated to approximately 188 revolutions per minute. To accomplish this in the circuit of Figure 2, the timer operated contactors 96 and 92 are caused to be closed while the timer operated contactors 90 and 94 are caused to be open. With the timer operated switch 96 closed, a circuit is completed for the spin shift solenoid through the contactor 126 of the centrifugal switch which shorts fixed contacts 136 and 138. The contactor 126 will still be in engagement with contacts 136 and 138 immediately upon the closing of timer operated contactors 92 and 96. When spin shift solenoid 120 is energized, it shifts the transmission from its forty to one ratio to a speed ratio of 4.0 to 1. The energization of coil 120 also causes the closure of contactor 122 with fixed contact 124. Since the transmission has been shifted, the motor will de-accelerate rapidly due to the loss of mechanical advantage and the motor speed will drop from approximately 1725 r.p.m. to a speed less than 750 r.p.m. During the de-celeration, the contactor 128 conects fixed contacts 132 and 134 at approximately 1200 r.p.m. motor speed. The de-celeration from 1200 r.p.m. motor speed to below 750 r.p.m. motor speed is so rapid that coil 100 is not energized sufficiently to cause movement of contactors 102, 104 and 106. In order to further insure that coil 100 will not be energized sufficiently after the transmission has been shifted, the timer operated contact 92 may be designed to close at a slight increment of time after the closure of timer contact 96.

With the motor now operating below 750 r.p.m., the contacts 140 and 142 are open and will not re-close until the motor speed attains 750 r.p.m. which corresponds to 188 r.p.m. tub speed since the solenoid shifter coil 120 is energized. The motor will accelerate with full torque since the phase or start circuit will be energized via contact 110. With centrifugal switch 131 in an open position, the motor will accelerate with full acceleration torque since the phase or start circuit has full line voltage applied thereto. The tub will now be accelerated with the transmission shifted to its high speed position, and at 750 r.p.m. motor speed or 188 r.p.m. tub speed, the centrifugal switch 131 will be operated to connect contacts 140 and 142. This will cause the relay 100 to be energized thus causing contactor 102 to engage fixed contact 108 and causing contactor 104 to shift into engagement with fixed contact 116. The energization of relay 100 causes contactor 106 to open or become disengaged from fixed contact 114 and this will completely de-energize the motor. The system will then coast under its own inertia for the remainder of the low speed spin cycle. It can be seen from the foregoing that the motor is accelerated with full acceleration torque up to a tub speed of 188 r.p.m. whereupon the motor is disconnected from the lines 80 and 82.

If an unbalance should occur within the tumbling drum 32 during the acceleration of the tube towards 188 r.p.m. the contactor 85 will be moved into engagement with fixed contact 86. When this occurs, the relay 100 is energized via line 82, contactor 85, lead 180 and line 182. The opposite side of the relay coil has a circuit via lead 130 and to the contactor 128 of the centrifugal switch. With coil 100 energized, the contactor 106 once more becomes disengaged from fixed contact 114 to cut off the motor for the remainder of the intermediate spin cycle. It can be seen from the foregoing that, during the intermediate spin cycle, the tub will always be accelerated to either 188 r.p.m. or to the speed below 188 r.p.m. at which the first excessive unbalance occurs, and will then be disconnected from the power input line for the remainder of the low speed spin cycle.

In washing machine apparatus, it is highly desirable to have the low speed spin cycle followed by a high speed spin cycle. To accomplish this result in Figure 2, the timer contacts 96 and 94 are caused to be closed while the timer operated contacts 90 and 92 are caused to be open. With these settings of the timer operated switches, the motor will be accelerated with full torque output; relay 100 is not energized and the phase circuit is fed directly from line 160 so long as no unbalance occurs. The motor will continue to accelerate with full torque output until the centrifugal switch 123 operates to disconnect the phase or start winding 72 from the circuit.

If the tub should become unbalanced during the high speed spin cycle and during acceleration toward high speed spin, the contactor 85 will be shifted into engagement with fixed contact 86. This causes the relay 100 to be energized via line 82, contactor 85, leads 180 and 182, lead 130 and to the centrifugal switch contactor 128. The energization of relay coil 100 will, as before, cause the closure of contactor 102, will cause the contactor 104 to shift into engagement with contact 116 and will cause the opening of contact 106. The opening of contactor 106 will not cut off the motor in the high speed spin cycle since it is now by passed by the closed timer contact 94. The shifting of contactor 104 into engagement with contact 116 causes the start winding now to be energized from tap 74 so that the motor is now accelerated with a lower torque value. Acceleration will now continue with the lower torque value until the motor centrifugal switch causes contactor 128 to be shifted out of engagement with contacts 134 and 132 to de-energize relay 100 and to disconnect the phase winding 72 from the circuit. If unbalance should occur after the contactor 128 has shifted out of engagement with contacts 132 and 134, the unbalance switch will cycle the motor on and off through the main winding 70.

It will be appreciated that, in going from the intermediate or low speed spin cycle to the high speed spin cycle, the solenoid shifting coil 120 remains energized due to the facts that the solenoid holding contact 124 remains closed and that the timer operated switch contact 96 is closed both during the low speed spin cycle and during the high speed spin cycle. It will also be appreciated that, during high speed spin not preceded by intermediate spin of the tub 32, the motor begins acceleration with its high torque output but is shifted back to a low torque output should an unbalance occur during acceleration; otherwise, tub 32 is accelerated with low torque. The final tub speed during the high speed spin becomes 431 r.p.m. with the motor operating at 1725 r.p.m. and a 4.0 to 1 speed ratio.

It is important to note that with the control arrangement illustrated in Figure 2, under normal conditions, it is never possible to energize the spin shift solenoid 120 when the motor starts from an at rest condition. This is true because, when the motor is at rest, the contactor 126 is out of engagement with the fixed contacts 136 and 138. This means that the spin shift solenoid 120 cannot be energized since this circuit is through the contactor 126. The contactor 126 thus will connect the spin shift solenoid 120 to be energized only when the motor speed is about 1500 r.p.m. which is the speed where the contactor 126 engages the contacts 136 and 138. Thus, even though the timer operated switch contact 96 is closed, the spin shift solenoid 120 will not be energized until the centrifugal switch shifts over to engage contacts 136 and 138. It, thus, is apparent that, if a power failure should occur when the timer operated switch contact 96 is closed, the energization of the motor circuit in Figure 2 will not cause the spin shift solenoid 120 to be energized since the centrifugal switch contactor 126 does not complete a circuit for the coil 120. The motor will thus have to accelerate in its low speed setting of the transmission before the transmission can be shifted to its high speed ratio. This feature greatly reduces the peak torque load applied to the drive motor of the washing machine and, thus, greatly reduces the stress and strain on the motor and on the other drive components of the washing machine system.

Figure 3:
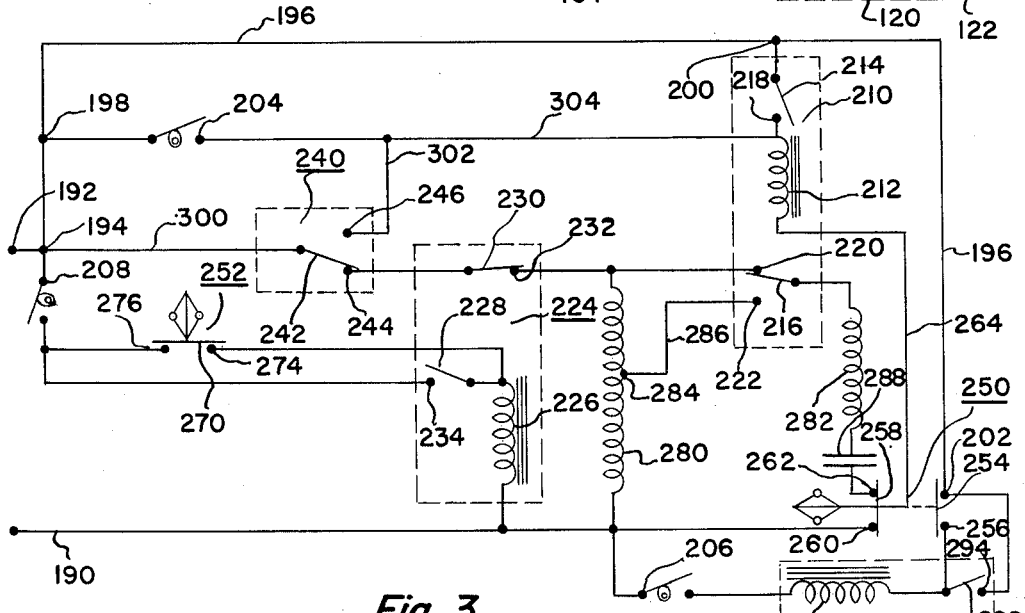
Figure 3 is a schematic illustration of a modified control circuit for the electric motor and two speed transmission that drives the tub of the washing machine illustrated in Figure 1.

In Figure 3, a modified circuit arrangement for controlling the operation of motor 46 and transmission 48 is illustrated. This circuit differs from the arrangement illustrated in Figure 2 in that the tub is permitted to attain 188 r.p.m. before the motor is de-energized irrespective of unbalanced movement of the tub. In other words, in the Figure 3 embodiment of this invention, the tub will always be accelerated to 188 r.p.m. during the low or intermediate spin cycle even though the unbalance switch may be operated by an unbalanced load condition in the tub 32.

Referring now to Figure 3, the input power lines are designated by reference numerals 190 and 192. These lines are adapted to be connected with a suitable source of A.C. voltage. The line 192 is connected with a junction 194 which is, in turn, connected with lead wire 196. Lead wire 196 forms a common connection for junctions 194, 198, 200 and is also connected with centrifugal switch contact 202. The timer operated contacts in Figure 3 are designated by reference numerals 204, 206 and 208. A relay generally designated by reference numeral 210 is provided having an actuating coil 212 which controls movable relay contactors 214 and 216. When relay coil 212 is de-energized, the contactor 214 is out of engagement with fixed contact 218 and the contactor 216 engages fixed contact 220. When relay coil 212 is energized, the contactor 214 engages contact 218 and the contactor 216 is shifted into engagement with fixed contact 222.

A second relay generally designated by reference numeral 224 is provided having a relay coil 226 which controls movable contactor 228 and 230. When relay coil 226 is deenergized, contactor 230 is in engagement with fixed contact 232 and contactor 228 is out of engagement with fixed contact 234. With the relay energized, the conditions are just reversed with contact 230 opening and contact 228 closing.

The unbalance switch which corresponds to switch 62 in Figure 1 is designated by reference numeral 240 in Figure 3. This switch has a movable contactor 242 which remains in engagement with fixed contact 244 as long as the tub is in a balanced condition and has no excessive side to side or front to back movement. When the tub becomes unbalanced or moves with excessive unbalanced movement, the contactor 242 will engage fixed contact 246.

In the circuit of Figure 3, a pair of centrifugal switches is once more provided, one of which is generally designated by reference numeral 250 and the other of which is generally designated by reference numeral 252. The centrifugal switch 250 has a back contact 254 which, at times, engages fixed contacts 202 and 256. The centrifugal switch 250 has a contact 258 that cooperates with fixed contacts 260 and 262. The contactor 258 is connected with lead wire 264 and the switch is driven by the motor 46. The switch operates to disconnect contacts 260 and 262 and to connect contacts 202 and 256 at 1500 r.p.m. and is arranged to connect contacts 262 and 260 once more at approximately 1200 r.p.m.

The centrifugal switch 252 is driven from the motor and has a contactor 270 that cooperates with fixed contacts 274 and 276. This switch remains open until the motor speed attains 750 r.p.m. whereupon it connects contacts 274 and 276.

The motor illustrated in Figure 3 has a four-pole main winding 280 and a four-pole phase or start winding designated by reference numeral 282. The main winding 280 is tapped as at 284 and this tap point is connected with contact 222 through a lead 286. A starting capacitor 288 is connected between start winding 282 and centrifugal switch contact 262.

For low speed tumbling with the circuit of Figure 3, timer operated switch contact 204 is caused to be closed and timer operated switch contacts 206 and 208 are caused to be opened. The closure of timer operated contactor 204 causes the relay coil 212 to be energized to thus shift contactor 216 into engagement with fixed contact 222 to cause the motor to accelerate under its low torque output value. The motor is accelerated with its low torque value since the phase winding will now be fed from tap point 284 and through lead 286. The motor will accelerate with its low torque output until the centrifugal switch 250 opens to de-energize relay 212 and the tumbling drum will be driven at 43 r.p.m. while the motor operates at 1725 r.p.m. on running winding only. This is due to the fact that the transmission shifting coil designated by reference numeral 290 is not energized.

For intermediate or low speed spin, the timer operated contact 204 is caused to be opened while the timer operated contacts 208 and 206 are closed. With timer operated contact 204 open, the circuit for relay coil 212 is opened so that the motor now accelerates at its full torque output with the phase circuit being connected directly across the line. The closure of timer operated switch contact 206 causes the spin shift coil 290 to be energized through centrifugal switch contactor 254 which has been closed during the time that the tub was driven at tumbling speed and at 1725 r.p.m. motor speed. Energization of spin solenoid 290 shifts the transmission from its low speed setting to its high speed setting. The motor is decelerated to approximately 172.5 r.p.m. and will now accelerate with full torque output with the transmission shifted until the speed reaches 750 r.p.m. whereupon the centrifugal switch 252 will cause contacts 274 and 276 to be connected. This will cause the relay coil 226 to be energized to open contactor 230 and thus de-energize the motor. The circuit thus operates in the same manner as Figure 2 in that 188 r.p.m. tub speed is attained before the motor is de-energized and is permitted to coast during the remainder of the low speed or intermediate spin speed cycles.

If an unbalance load occurs within tub 32 prior to reaching 188 r.p.m. tub speed, the contactor 242 is shifted into engagement with the fixed contact 246. This will de-energize the motor and cause the relay coil 212 to be energized via lead 300, contactor 242, lead 302, lead 304, through lead 264 and thence to the centrifugal switch contactor 258. When relay 212 becomes energized, it shifts the contactor 216 to cause the motor to accelerate at its reduced torque value after unbalance has been corrected. It can be seen that, with the circuit of Figure 3, the motor must accelerate the tub to 188 r.p.m. tub speed before centrifugal switch 270 operates to close contacts 274 and 276 and thus energize relay 226 to cause the opening of contactor 230 and the complete de-energization of the motor.

When it is desired to have a high speed spin cycle in Figure 3, the timer operated contacts 204 and 208 are caused to be opened while timer operated contactor 206 remains closed. This will cause the motor to be accelerated at its full torque output if no unbalance occurred during intermediate spin toward the 431 r.p.m. tub speed value. If an unbalance should occur during acceleration, the motor is de-energized and, after balance is restored, accelerates with its low torque output. The motor accelerates with the phase circuit energized until the centrifugal switch 258 becomes disconnected from contacts 260 and 262 whereupon the motor is accelerated to full speed by the main winding 280. If an unbalance occurs, the bump switch or unbalance switch 240 will cycle the motor on and off.

Figure 4:
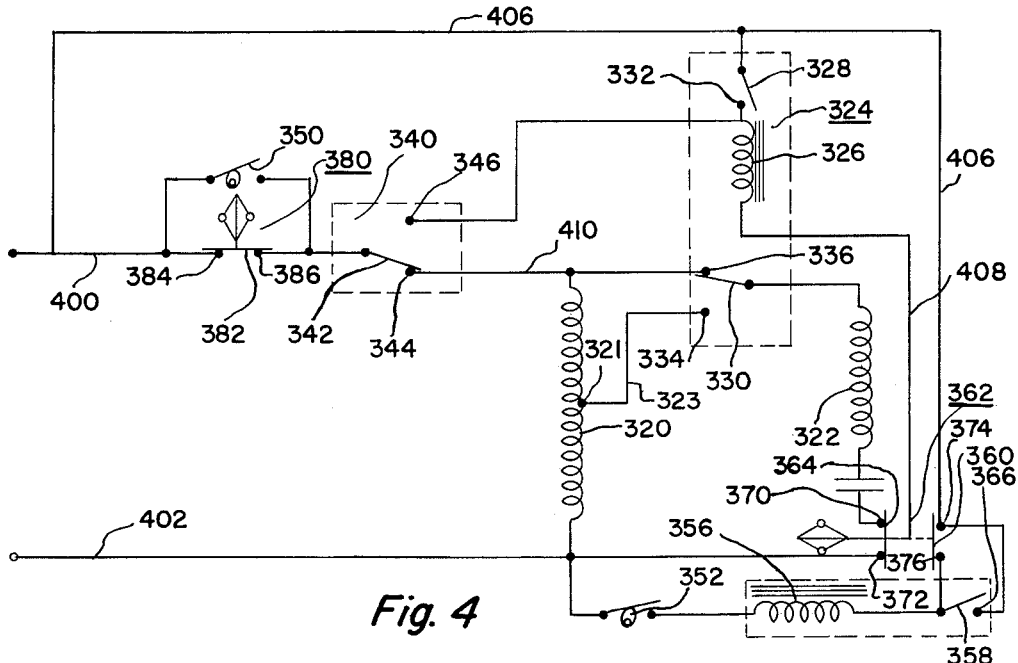
Figure 4 is still another modified control circuit arrangement for operating the motor and two speed transmission illustrated in Figure 1.

Referring now to Figure 4, still another modified circuit arrangement for controlling the drive motor of the washing machine and the spin shift solenoid is illustrated. In Figure 4, the main winding of the induction motor is designated by reference numeral 320 and the phase or start winding is designated by reference numeral 322. The main and start windings are both four-pole windings giving a speed of 1725 r.p.m. for the motor. In Figure 4, a relay generally designated by reference numeral 324 has an energizing coil 326 that controls contactors 328 and 330. When relay coil 326 is energized, contactor 328 is shifted into engagement with fixed contact 332 and contactor 330 is shifted into engagement with fixed contact 334. When solenoid coil 326 is de-energized, the contactor 328 is open and contactor 330 engages fixed contact 336. The unbalance switch in Figure 4 is designated by reference numeral 340 and includes a contactor 342 which engages fixed contact 344 when the tub is not moved with an unbalanced movement of such a magnitude as to trip the switch 62 illustrated in Figure 1. When the tub 24 moves with an excessive out of balance movement, the contactor 342 will be shifted temporarily into engagement with fixed contact 346.

The timer operated contacts in Figure 4 are designated by reference numerals 350 and 352. The spin shift solenoid in Figure 4 is designated by reference numeral 356 which causes contactor 358 to become closed or engaged with fixed contact 366 when the coil 356 is energized. It will be understood that, when the coil 356 is energized, the transmission 48 is shifted from its low to its high speed position.

In the Figure 4 embodiment of this invention, the centrifugal switch that controls the phase winding 322 is generally designated by reference numeral 362. This switch, as in the other embodiments, has a front contact 364 and a back contact 360 which cooperate with fixed contacts as shown. When the motor speed exceeds 1500 r.p.m., the centrifugal switch operates to disconnect the fixed contacts 370 and 372 and causes the contacts 374 and 376 to be connected.

In the arrangement of Figure 4, an auxiliary centrifugal switch is included which is generally designated by a reference numeral 380. This centrifugal switch includes a contactor 382 that cooperates with fixed contacts 384 and 386. The centrifugal switch 380 is connected to be driven at tub speed rather than at motor speed as was the case in the previous embodiment described. Thus, at 188 r.p.m. tub speed, the contactor 382 will be shifted out of engagement with contacts 384 and 386. At all speeds below 188 r.p.m. tub speed, the fixed contacts 384 and 386 are connected together by centrifugally operated contactor 382.

The input power lines are designated by reference numerals 400 and 402, and these lines are adapted to be connected with a suitable source of A.C. voltage. The line 400 is connected with a line 406 which also connects to one side of contactor 328 and with the centrifugal switch contact 374. The centrifugal switch contactor 364 is connected to one side of relay coil 326 via a lead 408 and, as in previous embodiments, the contactor 360 is not electrically connected with either contactor 364 or lead wire 408 but moves with the movement of contactor 364.

When it is desired to effect a low tumbling speed of tumbling drum 32, the timer operated contactor 352 is caused to be opened whereas the timer operated contactor or switch 350 is caused to be closed. The motor is now energized with its high torque value via line 400 through timer operated switch 350, through bump switch contactor 342, through line 410 and through contactor 330. The motor will thus accelerate at its high torque value until the centrifugal switch 362 moves rightwardly to disconnect the phase or start winding 322 from the circuit. In this mode of operation, the motor operates at 1725 r.p.m. and, since the spin shift solenoid 356 is not energized, the tub 32 is driven at approximately 43 r.p.m.

When it is desired to effect a low speed or intermediate spin cycle immediately following the low tumbling cycle, the timer operated switch 352 is closed and the timer operated switch 350 is caused to be opened. The closure of timer operated contact 352 will cause the energization of spin shift solenoid 356 due to the fact that the motor has not slowed down at this time sufficiently to cause contactor 360 to shift away from fixed contacts 374 and 376. This is due to the fact that the timer operated switches are shifted in a very short time immediately following the tumble setting of the timer operated switches. With spin shift solenoid 356 energized, the contactor 358 is moved into engagement with contact 366. The centrifugal switch contactor 382 will maintain a connection between fixed contacts 384 and 386. The motor will now accelerate at its full torque output since the phase winding will be energized with full voltage input through contactor 330. When 188 r.p.m. tub speed is attained, however, the centrifugal switch 380 will open to disconnect fixed contacts 384 and 386 and thus de-energize the motor. As the motor slows down once more, the contacts 384 and 386 will be re-connected and it is thus seen that the motor is cycled on and off to cause it to operate at 750 r.p.m. motor speed and 188 r.p.m. tub speed. In this mode of the operation, the centrifugal switch 362 will remain in its leftward position connecting contacts 370 and 372 so that the start winding is energized at all times during the intermediate or slow speed spin cycle.

If an unbalance should occur during the spin cycle, the motor will be de-energized and shifted over to its low torque output value by reason of the shifting of contactor 342 into engagement with contact 346 and the resultant shifting of contactor 330 into engagement with fixed contact 334. When the unbalance is corrected, the motor once more accelerates under low torque output since the contactor 342 will once more become engaged with fixed contact 344. The arrangement of Figure 4 differs from the other embodiments described hereinbefore in that the motor is cycled on and off after 188 r.p.m. tub speed is attained rather than completely deenergizing the motor.

When it is desired to effect the ultimate or high speed spin cycle with the circuit of Figure 4, the timer operated switch contact 352 is caused to be closed and the timer operated switch contact 350 is likewise caused to be closed. Since the final spin cycle immediately follows the intermediate or low speed spin cycle and since timer operated switch contact 352 remains closed in both the intermediate and high speed spin cycle the spin shift solenoid coil 356 will remain energized to keep the transmission shifted to its high speed setting. Since timer operated switch contact 350 is closed at this time, the centrifugal switch 380 has no effect on the circuit as it is short-circuited by timer operated switch 350. With these settings of timer operated switches 350 and 352, the motor will accelerate to its 1725 r.p.m. speed and, with the coil 356 energized, the tub will be operated at 431 r.p.m.

Figure 5:
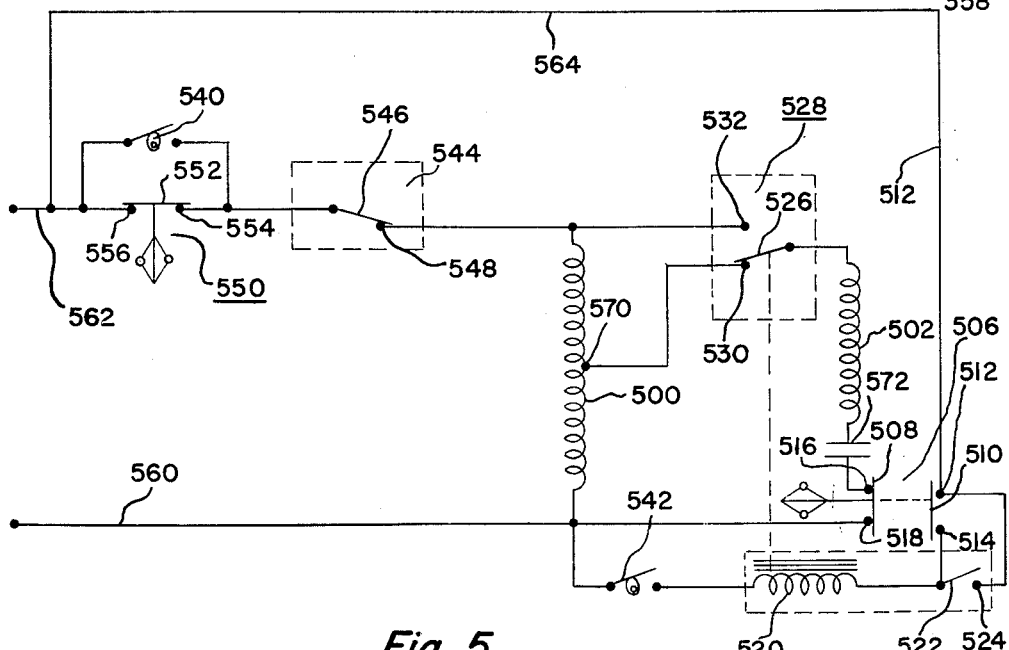
Figure 5 is a schematic diagram of still another modified arrangement for operating the motor and two speed transmission illustrated in Figure 1.

Referring now to Figure 5, still another embodiment of a control circuit for controlling the motor and spin shift solenoid illustrated in Figure 1 is shown. In Figure 5, the main winding of the motor is designated by reference numeral 500 and the phase or start winding is designated by refernece numeral 502. Both the main and start windings are four-pole windings and the motor will thus operate at a running speed of approximately 1725 r.p.m. A centrifugal switch generally designated by reference numeral 506 is provided having a front contact 508 and a back contact 510. The back contact 510, at times, engages fixed contacts 512 and 514 whereas the front contact, at times, engages fixed contacts 516 and 518. The front contactor 508 and back contactor 510 are mechanically but not electrically connected together. The centrifugal switch 506 remains in the position illustrated in Figure 5 until a motor speed of 1500 r.p.m. is attained whereupon contacts 516 and 518 are disconnected and contacts 512 and 514 are connected. When the motor speed drops to 1200 r.p.m., the centrifugal switch contactors 508 and 510 move back to their positions illustrated in Figure 5.

In the embodiment illustrated in Figure 5, the relay for shifting the transmission is designated by reference numeral 520. This relay coil or solenoid coil also operates a contactor 522 which cooperates with fixed contact 524. In addition, the coil 520 operates a switch contactor 526 which forms a part of a relay operated time delay switch generally designated by reference numeral 528. When coil 520 is de-energized, the contact 522 is maintained out of engagement with contact 524 and the contact 526 engages fixed contact 530. When coil 520 is energized, the contactor 522 engages fixed contact 524 and the movable contactor 526 is caused to move into engagement with fixed contact 532. The switch 528 is so designed that the contactor 526, after being shifted into engagement with contact 532, will move back into engagement with contact 530 after a predetermined time delay. In the arrangement of Figure 5, the timer operated switches are designated by reference numerals 540 and 542. The bump switch is designated by reference numeral 544 and includes a movable contact switch 546 which engages fixed contact 548 when the tub 24 is not moved with excessive unbalance to shift the switch. When the tub 24 does move under an unbalanced load condition, the switch 544 is actuated so that contactor 546 is temporarily moved out of engagement with fixed contact 548.

A centrifugal switch generally designated by reference numeral 550 is provided which is driven at tub speed rather than at motor speed. The centrifugal switch includes a movable contactor 552 which, at times, shorts fixed contacts 554 and 556. When tub speed reaches 188 r.p.m., the contactor 552 is shifted out of engagement with contacts 554 and 556. At tub speeds below 188 r.p.m., the contactor 552 connects contacts 554 and 556.

The input power leads of Figure 5 are designated by reference numerals 560 and 562. It is seen that lead 562 is connected with a lead wire 564 which is, in turn, connected to centrifugal switch contact 512. The main winding 500 of the motor is tapped as at 570 and this tap point is connected with fixed switch contact 530. The phase or start winding 502 of the motor is connected between movable contactor 526 and a starting capacitor designated by reference numeral 572.

When it is desired to effect a low speed tumbling operation of the tub 32, the timer operated switch 540 is caused to be closed and the timer operated switch 542 is caused to be opened. Since the spin shift coil 520 is not energized at this time, the transmission remains at the slow speed setting and the motor accelerates under its lower value of torque output due to the fact that contactor 526 is now in engagement with contact 530. The phase or start winding of the motor is thus energized from the tap point 570 with less than full output voltage. The motor will accelerate with the start winding connected until the centrifugal switch 506 operates, whereupon the motor will operate on the main winding only at 1725 r.p.m. and driving the tub at approximately 43 r.p.m.

When it is desired to effect an intermediate or low speed spin of the tub 32, the timer operated switch 542 is caused to be closed and the timer operated switch 540 is caused to be opened. This shifting of the timer operated switches, as in the embodiments described hereinbefore, occurs instantaneously so that coil 520 will be energized via timer operated switch 542 before the centrifugal switch contactor 510 can leave contacts 512 and 514. This means that the transmission will be shifted from its low to its high speed setting and also means that the contactor 526 will be shifted upwardly to engage contact 532. With contactor 526 now engaging fixed contact 532, the motor will accelerate at its full torque output since the start winding is now connected directly across the line rather than being fed from tap point 570. The motor will then accelerate with full torque output until the predetermined time delay of switch 528 has passed whereupon the contactor 526 shifts back into engagement with fixed contact 530 and causes acceleration at a lower torque output. This method of acceleration continues until the tub speed reaches 188 r.p.m. whereupon the centrifugal switch contactor 552 disconnects contacts 554 and 556 to completely de-energize the motor. As the motor slows down, however, the contacts 554 and 556 are again shorted together to once more energize the motor. The centrifugal switch 550 thus will cycle the motor on and off during the remainder of the intermediate spin cycle and the acceleration during the cycling will be at low torque output with contactor 526 in engagement with switch contact 530. If an unbalance should occur during the intermediate low speed spin cycle, it is seen that switch contact 546 will be shifted away from fixed contact 548 to temporarily de-energize the motor.

When it is desired to effect a high speed or ultimate spin speed of the tumbling drum 32, the timer operated switch 540 is caused to be closed and the timer operated switch 542 remains closed. The spin shift solenoid 520 remains energized through the holding contact 522 so that the transmission remains in its high speed ratio setting. The motor will now accelerate under its lower value of torque since switch contactor 526 will not be shifted to engage fixed contact 532 due to the fact that the spin shift solenoid 520 has not been de-energized and then re-energized following the intermediate spin cycle. The motor will now accelerate with its lower value of torque to its high speed spin which is 1725 r.p.m. motor speed and 431 r.p.m. tub speed. If an unbalance occurs during the high speed spin cycle, the switch 544 is opened to temporarily de-energize the motor. When the unbalance has been cured, the contactor 546 re-engages contact 548 and acceleration continues to the top spin speed. When a speed is reached causing the opening of centrifugal switch 506, the phase winding or start winding 502 is disconnected from the circuit.

It will be appreciated that, with the circuit of Figure 5, the first energization of coil 520 causes the motor to be shifted through its high torque output for a predetermined time whereupon the motor is shifted back to its lower torque output. If the machine was set up so that the final spin cycle immediately follows the low speed tumbling cycle, the machine would accelerate under high torque for a predetermined time and would then be shifted over to its lower torque output due to the operation of time delay switch 528.

While the embodiments of the invention as herein disclosed constitute preferred forms, it is to be understood that other forms might be adapted.

What is claimed is as follows:

1. In combination, a machine having a rotatable container adapted to be driven at a low speed and at a higher speed, an electric motor having a predetermined speed, two speed transmission means connected between said motor and container having a low speed output and a higher speed output, means for causing said container to be driven at said low speed including means for causing said motor to be energized while said transmission means is set in its low output speed mode of operation, and means for causing said container to rotate at said higher speed, said last named means including means for causing said motor to be energized and for shifting of said transmission means to its high speed output mode of operation, and speed responsive mean for causing said motor to become de-energized at a predetermined rotational speed of said container following shifting of said transmission means to said higher speed output setting, said rotational speed corresponding to a motor speed that is less than the rated running speed of the motor.

2. In combination, a washing machine having a rotatable tub adapted to be driven at a low speed and at a higher speed, an electric motor having a predetermined output speed, variable output speed transmission means connected between said electric motor and said tub, means for causing said tub to be driven at said low speed including means for energizing said electric motor while said transmission means is set for its lower output speed, means for causing said tub to be driven at said higher speed including means for shifting said transmission to its higher output speed mode of operation while said motor is energized and for then causing said motor to become deenergized in response to said tub attaining said higher output speed, said higher tub speed corresponding to a motor speed which is less than the rated running speed of the motor, and means for causing said motor to be deenergized in response to predetermined unbalanced movement of said tub.

3. In combination, a washing machine having a rotatable tub adapted to be driven at a low speed for a predetermined length of time and adapted to be driven at a higher speed for a predetermined length of time, an electric motor having a predetermined speed output, variable output speed transmission means connected between said electric motor and said tub, means for causing said tub to be driven at said low speed output including means for maintaining said motor energized and said transmission at its low output speed setting for a predetermined length of time, and means for causing said tub to at least attain its higher speed output including means for causing said motor to be energized and said transmission shifted to said higher output speed and for then causing said motor to be deenergized in response to said tub attaining said higher speed, said higher speed corresponding to a motor speed that is less than the running speed of the motor.

4. In combination, a washing machine having a rotatable tub adapted to be driven at a low speed, an intermediate spin speed and a high spin speed that is higher than either said low speed or said intermediate spin speed, an electric motor having a predetermined output speed, variable output speed transmission means connected between said electric motor and said tub, means for causing said tub to be driven at said low speed including means for energizing said electric motor while said transmission means is set to its low output speed, means for causing said tub to attain said intermediate spin speed including means for energizing said electric motor and for shifting said transmission means to its higher output speed, and including means for causing said motor to become deenergized in response to said tub attaining said intermediate spin speed, and means for causing said tub to be driven at said high spin speed including means for causing said motor to be continuously energized and operated at its running speed while said transmission is shifted to its high output speed mode of operation.

5. In combination, a washing machine having a rotatable tub adapted to be driven at a low speed and at a higher speed, an electric motor having a predetermined speed output, variable output speed transmission means connected between said electric motor and said tub having a low speed output and a higher speed output, means for causing said tub to be driven at said low speed including means for energizing said electric motor while said transmission means is set for its low speed output, and means for causing said tub to be driven at said higher speed output, said last named means including means for causing said motor to be energized intermittently while said transmission means is maintained set for its higher speed output, said intermittent energizing means including means for connecting said motor with a power source when the speed of said tub is below said higher speed and for disconnecting said motor from the power source when said tub speed is above said higher speed.

6. In combination, a washing machine having a rotatable tub adapted to be driven at a low output speed and at a higher speed, an electric motor having a predetermined output speed, variable output speed transmission means connected between said electric motor and said tub, means for causing said tub to be driven at said low output speed including means for energizing said electric motor while said transmission means is set to operate at its low output speed, and means for causing said tub to be driven at said higher speed, said last named means including means for energizing said electric motor while said transmission means is shifted to its high output speed, and centrifugal switch means for disconnecting said electric motor from a power source when said tub attains said higher speed and for connecting said electric motor with said power source when said tub speed is below said higher speed while said transmission means is set for its high speed output.

7. In combination, a washing machine having a rotatable tub adapted to be driven at a low speed and at a higher speed, an electric motor having a predetermined speed output, a power source, variable output speed transmission means connected between said electric motor and said tub, means for causing said electric motor to be energized and for causing said transmission to be set for its lower output speed to provide said low speed for said tub, means for causing said tub to be driven at said higher speed including centrifugal switch means adapted to control the energization of said electric motor to operate it at less than its rated running speed and including means for causing said transmission means to be maintained shifted to its high output speed.

8. In combination, a washing machine having a rotatable tub adapted to be driven at a low speed, an intermediate spin speed that is higher than said low speed and a high spin speed that is higher than either said low speed or intermediate spin speed, an electric motor having a predetermined speed output, variable output speed transmission means connected between electric motor and said tub having a low output speed and a higher output speed, means for causing said tub to be driven at said low speed including means for energizing said electric motor while said transmission is set to operate on its low output speed, means for causing said tub to be driven at said intermediate spin speed including means for energizing said electric motor when said tub speed is below said intermediate spin speed and for de-energizing said electric motor when said tub speed is above said intermediate speed while maintaining said transmission set at its high output speed, and means for causing said tub to be driven at said high spin speed including means for continuously energizing said electric motor while said transmission is set to its high output speed.

9. In combination, a washing machine having a rotatable tub that is adapted to be driven at a low speed and at a higher speed, an electric motor having a predetermined speed output and adapted to be connected to provide a low torque output and a higher torque output, variable output speed transmission means connected between said electric motor and said tub having a low speed output and a higher speed output, means for accelerating said tub toward said low speed including means for connecting said motor to provide its low torque output while said transmission means is maintained at its low output speed setting, and means for accelerating said tub toward its higher speed output including means for connecting said motor to provide its higher output torque value while said transmission is shifted to provide its higher output speed, and means responsive to excessive out-of-balance movement of said tub for shifting said motor back to its low torque output value during the time that said motor is being accelerated toward its higher output speed.

10. In combination, a washing machine having a rotatable tub that is adapted to be driven at a low speed and at a higher speed, an electric motor having a predetermined speed output and adapted to be connected to provide a low torque output and a higher torque output, variable output speed transmission means connected between said electric motor and said tub having a low speed output and a higher speed output, means for accelerating said tub toward said low speed while said transmission means is maintained at its low output speed setting, and means for accelerating said tub toward its higher speed output including means for connecting said motor to provide its higher output torque value while said transmission is shifted to provide its higher output speed, and means responsive to excessive out-of-balance movement of said tub for shifting said motor back to its low torque output value during the time that said motor is being accelerated toward its higher output speed.

References Cited in the file of this patent

UNITED STATES PATENTS

| | | |
|---|---|---|
| 2,150,638 | Scott | Mar. 14, 1939 |
| 2,447,848 | Edwards | Aug. 24, 1948 |
| 2,673,320 | Oliwa | Mar. 23, 1954 |
| 2,717,698 | Armstrong | Sept. 13, 1955 |
| 2,760,639 | Haverstock | May 22, 1958 |

FOREIGN PATENTS

| | | |
|---|---|---|
| 215,320 | Australia | May 22, 1958 |

Notice of Adverse Decision in Interference

In Interference No. 92,507 involving Patent No. 2,981,089, G. A. Neyhouse, J. W. Savage and R. K. Skewmon, POWER DRIVE APPARATUS, final judgment adverse to the patentees was rendered Jan. 8, 1965, as to claims 1, 3, 4, 5, 6, 7, and 8.

[*Official Gazette February 23, 1965.*]